3,092,547
METHODS OF TREATING OXYURID WORMS WITH QUATERNARY AMMONIUM COMPOUNDS
Geoffrey George Coker and Frederick Charles Copp, London, England, assignors to Burroughs Wellcome & Co. (U.S.A.) Inc., Tuckahoe, N.Y., a corporation of New York
No Drawing. Filed Mar. 28, 1961, Ser. No. 98,749
Claims priority, application Great Britain Mar. 13, 1959
4 Claims. (Cl. 167—53)

The present invention relates to a novel use of quaternary ammonium compounds, and is a continuation-in-part of our copending U.S. application No. 860,376, filed on December 18, 1959, now abandoned.

The present invention relates specifically to the treatmento f infestations of oxyurid worms, such as *Enterobius vermicularis*. A number of compounds such as piperazine and its salts are in medical practice effective against infestations of oxyurid worms, but this effectiveness is only at large dose levels or in repeated doses. It has now been found that therapeutically acceptable salts of the N-4-chlorobenzyl - N -2 - (4 - chlorophenoxyethyl) - N - 4-chlorobenzyl - N - 2 - (4 - bromophenoxyethyl)- and N-4-bromobenzyl - N - 2 - (4 - chloro - 2 - isopropyl - 5-methylphenoxyethyl) - N,N - dimethylammonium cations are highly effective at a relatively low dose level and in a single dose against *Syphacia obvelata* and *Aspiculuris tetraptera* in mice and *Enterobius vermicularis*.

The present invention, therefore, provides a process for the treatment of infestations of oxyurid worms which comprises the administration to the host of the infested locus of a therapeutically acceptable salt of a quaternary ammonium cation selected from the class consisting of N - 4 - chlorobenzyl - N - 2 - (4 - chlorophenoxyethyl)-N,N - dimethylammonium, N - 4 - chlorobenzyl - N - 2- (4 - chlorophenoxyethyl) - N,N - dimethylammonium and N - 4 - bromobenzyl - N - 2 - (4 - chloro - 2 - isopropyl-5-methylphenoxyethyl - N,N - dimethylammonium cations.

The preferred therapeutically acceptable salts of the said ammonium cations are those which are sparingly soluble in water, because the toxic effect of the cations are reduced whilst the anthelmintic properties are retained. Particularly useful salts are those of embomic, 2-hydroxy-3-naphthoic, laurylsulphuric, p-bromobenzenesulphonic, p-chlorobenzenesulphonic, p-toluenesulphonic, dodecylbenzenesulphonic, diphenyl-1-sulphonic, naphthalene-1-sulphonic, naphthalene-2-sulphonic, naphthalene-1,3-disulphonic, naphthalene-2,7-disulphonic, naphthol-3,5-disulphonic, 2-naphthol-3,6-disulphonic, 1-naphthoic, 2-naphthoic, 4,4' - dihydroxydiphenyl - methane - 3,3' - dicarboxylic, piperazine-1,4-bis-carbodithioic, p-acylamidobenzenesulphonic, N-acylamido, 4,4'-diaminostilbene-2,2'-disulphonic and perchloric acids, and of phenols such as 2,4,5-trichlorophenol.

The therapeutically acceptable salts of the said ammonium cations are conveniently prepared by the reaction of a tertiary amine containing all but one of the groups desired in the salt with a reactive derivative of the group it is desired to introduce. The reactive derivative carries a reactive group such as a chloride, bromide or iodide group or a sulphonic ester group—$O.SO_2E$ wherein E is a substituted or unsubstituted hydrocarbon group such as a p-tolyl group. Thus, they may be prepared by the reaction of an N,N-dimethyl-N-2-phenoxyethylamine with a benzylating agent, of an N-benzyl-N-methyl-N-2-phenoxyethylamine with a methylating agent, or of an N-benzyl-N,N-dimethylamine with a reactive derivative of the 2-phenoxyethyl group. The salt produced by any of these reactions may be converted by double decomposition, either during or after the particular reaction, into the salt of another anion, which may be particularly desirable if a salt which is sparingly soluble in water is required.

The therapeutically acceptable salts of the said ammonium cations may be administered in pharmaceutical formulations made by any of the methods known to pharmacy. For oral administration fine powders or granules of the salts may contain diluents and dispersing and surface active agents, and may be presented in a draft in water or in a syrup; in capsules or cachets in the dry state or in a non-aqueous suspension, when a suspending agent may be included; in tablets, when binders and lubricants may be included; or in a suspension in water or syrup or an oil, or in a water/oil emulsion, when flavouring, preserving, suspending, thickening and emulsifying agents may be included. The granules or the tablets may be coated.

The effective dose range of the therapeutically acceptable salts of the said cations to be administered to the host of the oxyurid worms depends on a number of variable factors such as the toxicity and effectiveness of the particular cation and of the particular salt, the maturity and health of the host, and the mode and frequency of administration. The dose range lies, however, between 2.0 g. and 0.50 g.

The invention will now be described with reference to the following examples in which all temperatures are given in degrees centigrade.

*Example 1*

A mixture of 4-chlorophenol (14.3 g.), 2-chloroethyldimethylamine hydrochloride (23 g.) and sodium hydroxide flake (12.8 g.) was heated and stirred in boiling toluene (100 ml.) for 20 hours. The cooled mixture was extracted with dilute hydrochloride acid, and the extracts were washed with ether.

Treatment of the acid extracts with sodium hydroxide solution liberated 2 - (4 - chlorophenoxy)ethyldimethylamine, which was isolated by means of ether and distilled, B.P. 139–145°/16 mm.

Treatment of the base (3.3 g.) with an excess of 4-chlorobenzyl chloride (6.5 g.) in boiling acetone (50 ml.) yielded N - 4 - chlorobenzyl-N-2-(4-chlorophenoxy)ethyl-N,N-dimethylammonium chloride, which was crystallized from ethanol, M.P. 228–229°.

*Example 2*

N - 4-chlorobenzyl - N - 2 - (4 - bromophenoxyethyl)-N,N-dimethylammonium chloride, M.P. 214–215° and crystallized from methanol, and 2-(4-bromophenoxy)-ethyldimethylamine, B.P. 150–152°/15 mm., were prepared by methods analogous to those described in Example 1.

*Example 3*

Granules were prepared from the following ingredients:

| | Percent by weight |
|---|---|
| N - 4 - bromobenzyl - N - 2 - (4 - chloro - 2 - isopropyl - 5 - methylphenoxyethyl-N,N - dimethylammonium chloride | 87.8 |
| Centrimide, as a dispersing agent | 0.3 |
| Lactose, as an inert diluent | 11.2 |
| Sodium saccharin | 0.7 |

The sodium saccharin was mixed with the lactose, and the chloride added. The mixture was granulated with the centrimide in ethanol. The granules were sifted, dried and again sifted.

The granules were suitable for oral administration in water by stirring, in a syrup by trituration or in hard or soft gelatin capsules.

Example 4

Tablets were prepared from the following ingredients:

| | Mg. |
|---|---|
| N - 4 - bromobenzyl - N - 2 - (4 - chloro - 2 - isopropyl - 5 - methylphenoxyethyl) - N,N - dimethylammonium chloride | 200 |
| Lactose, as an inert diluent | 200 |
| Starch, as a binding agent | 20 |
| Magnesium stearate, as a lubricating agent | 4 |

The chloride was triturated with the finely powdered lactose and the starch, in an atmosphere of low humidity. The powdered mixture was moistened with a granulating solution of gelatin in 50% ethanol and the materials kneaded together till a firm mass was obtained. The mass was sifted and dried at a temperature not exceeding 50°. The dried granules were sifted, mixed with the magnesium stearate and compressed into tablets in the usual way.

The tablets were suitable for sugar-coating by applying shellac followed by a sugar solution, or for enteric coating with cellulose acetate phthalate.

Example 5

Similar preparations to those in Examples 3 and 4 were made of:

(a) N - 4 - chlorobenzyl - N - 2 - (4' - bromophenoxyethyl) - N,N - dimethylammonium chloride (Example 1); and
(b) N - 4 - chlorobenzyl - N - 2 - (4 - bromophenoxyethyl) - N,N - dimethylammonium chloride (Example 2).

We claim:

1. A process for the treatment of infestations of oxyurid worms which comprises the administration to the host of the infested locus of a quaternary ammonium salt whose cation is selected from the class consisting of N - 4 - chlorobenzyl - N - 2 - (4 - chlorophenoxyethyl) - N,N - dimethylammonium, N - 4 - chlorobenzyl - N - 2 - (4 - bromophenoxyethyl) - N,N - dimethylammonium and N - 4 - bromobenzyl - N - 2 - (4 - chloro - 2 - isopropyl - 5 - methylphenoxyethyl) - N,N - dimethylammonium cations and whose anion is that of a therapeutically acceptable acid in a dose range of 2.0 g. to 0.50 g.

2. A process as claimed in claim 1 wherein the cation is N - 4 - chlorobenzyl - N - 2 - (4 - chlorophenoxyethyl) - N,N - dimethylammonium.

3. A process as claimed in claim 1 wherein the cation is N - 4 - chlorobenzyl - N - 2 - (4 - bromophenoxyethyl) - N,N - dimethylammonium.

4. A process as claimed in claim 1 wherein the cation is N - 4 - bromobenzyl - N - 2 - (4 - chloro - 2 - isopropyl - 5 - methylphenoxyethyl) - N,N - dimethylammonium.

References Cited in the file of this patent

UNITED STATES PATENTS 2,918,401　　Copp　　Dec. 22, 1959